UNITED STATES PATENT OFFICE.

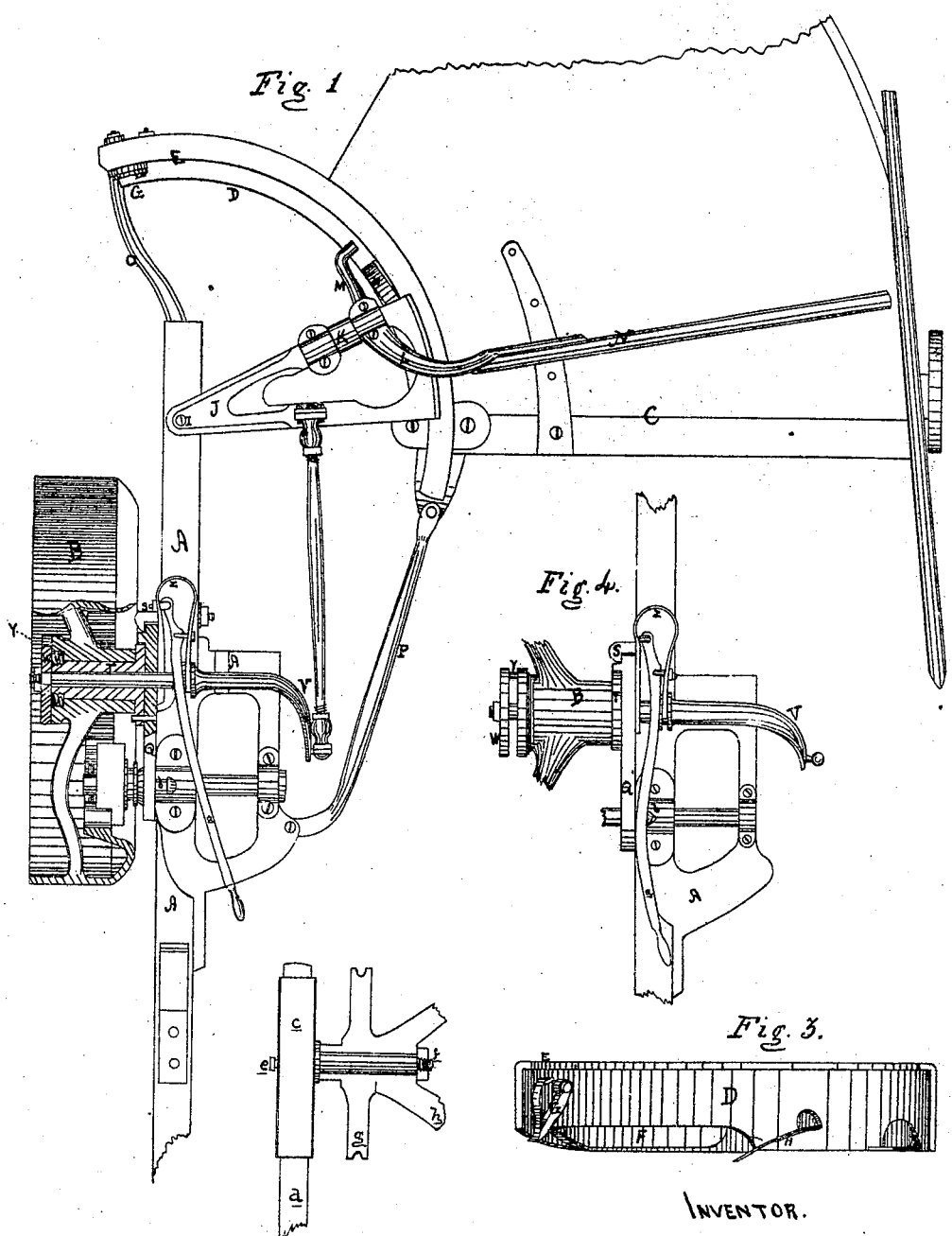

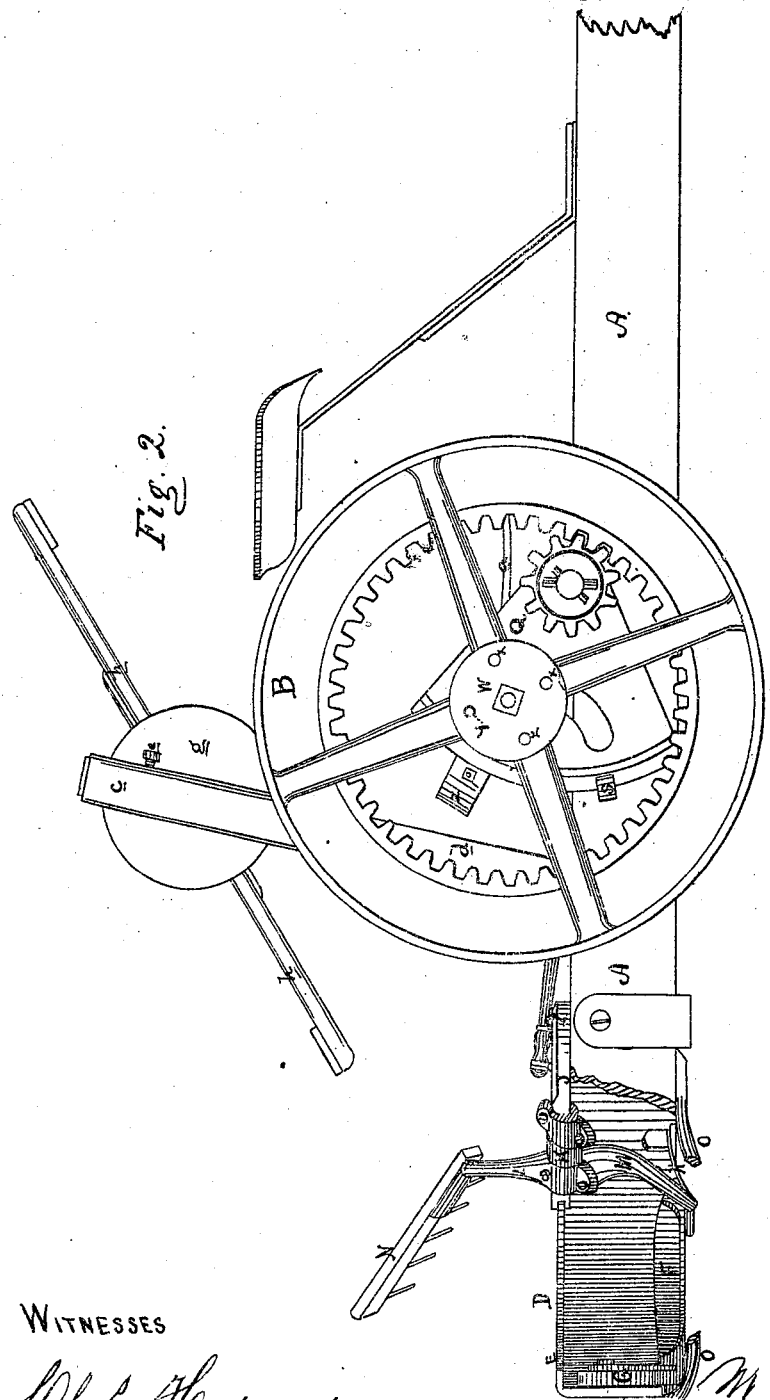

WILLIAM N. WHITELEY, JR., OF SPRINGFIELD, OHIO.

IMPROVEMENT IN HARVESTERS.

Specification forming part of Letters Patent No. 59,303, dated October 30, 1866.

*To all whom it may concern:*

Be it known that I, WILLIAM N. WHITELEY, Jr., of Springfield, in the county of Clarke and State of Ohio, have invented a new and useful Improvement in Harvesting-Machines; and I do hereby declare the following to be a full, clear, and exact description of the same, reference being had to the accompanying drawings, in which—

Figure 1 is a plan view of my machine, the master-wheel being shown partly in section. Fig. 2 is a side elevation of the same. Fig. 3 is an elevation of the rake-guide arch. Fig. 4 shows the manner of throwing the rake out of gear. Fig. 5 shows my method of hanging the reel.

The nature of my invention consists, first, in the mode of hanging and operating an automatic sweep-rake, so that while its horizontal movements are around a center of motion about in line with the cutter-bar, its vertical movements are upon an axis in rear of the line of said cutter-bar, and the devices by which these movements are accomplished, the consequence being that the rake will commence to move sidewise as soon as it commences to move backward, and when it rises from the platform its outer end will rise higher than its inner end; second, in placing the master-wheel upon a hollow axle, within which the crank-shaft which drives the rake may have its bearing and be driven from the outside of the said master-wheel; third, in the improved method of hanging the reel.

That others may understand my invention, I will describe it.

A is the main frame, B is the master-wheel, and C is the cutting apparatus and platform. To the inner side of the platform I secure the arch D, which describes about one-third of a circle, and extends from a little in front of the cutting apparatus to a point quite in rear of the outer side of the main frame. The upper edge of the arch D is provided with a flange, E, Figs. 1, 2, and 3, and at the lower edge, on the concave side, is the stationary camway F, with spring-latches G and H at its ends. The arch D is concentric to a point, I, on the main frame, about in line with the cutting apparatus, though if it be desirable it may be even a little in front of said line. At the said center point is pivoted the vibrating frame J, which is made V-shaped, with a curved head, provided with a groove, which fits over the flange E, so that the frame may move back and forth upon its center of motion, being guided and confined by said flange.

To the forward bar of the frame J the driving-pitman is attached, and to the rear bar of the same the rake is attached in the following manner: A portion of the rear bar is made true and cylindrical, so as to be a journal, upon which the rake may move in rising from and falling upon the platform. Upon this journal is placed the properly-fitted box k, from the upper part of which projects the arm L, and from the under part the arm M. The arm L curves upward, forward, and outward, and projects over the platform far enough to permit the rake-head N to be secured to it in such a position that it shall extend in line with the center I, around which it sweeps. The arm M curves downward and backward, and its lower end is turned horizontally outward far enough to rest on the upper surface of the camway F when the rake is upon the platform, and beneath the same when the rake is raised up.

The office of the camway, in connection with the arm M, is to keep the rake from rising from the platform while it is moving backward to remove a gavel, and raise it up from the platform and hold it so while it is moving forward again. This latter position is shown in Fig. 2, and the former position in Fig. 1. To secure this rising and falling of the rake the latches G and H are provided. Their operation is apparent. As the rake is pushed backward, the horizontal end of the arm M slides along the upper surface of F and prevents the rake from rising from the platform, because the rake cannot rise unless this end of M can descend at the same time. When the rear end of the stroke of the rake has almost been reached, the horizontal end of M comes in contact with and raises the latch G, and in so doing pushes past the rear end of the camway F. As the motion of the rake is reversed, the end of M is forced to descend to the lower side of F by the inclined surface, upon which it is forced by the spring of the latch G after passing the rear end of the camway. When the arm M is canted downward, as it must be in passing to the lower side of F, the arm L and rake N are canted upward in a corresponding degree, for they are both connected to the box K, with which they move. When the rake is drawn forward to a point nearly vertical to the cutters, the horizontal portion of the arm M passes in front of the camway F. The weight of the rake causes it to fall into the gavel upon the platform. The spring-latch H insures this movement, and would prevent a return of the arm M under the camway F, even if anything should prevent the fall of the rake at the proper moment.

From this description it will appear that as the rake is moved backward it moves backward and sidewise from the first instant, because its center of motion is as far forward as the farthest forward point reached by the rake. When the rear end of the stroke is reached and the return commenced, the rake is raised up by the joint action of the arm M and cam F, the outer end being raised higher than the inner end, because the rake-head is always in line with the center, I, of its reciprocatory movement. The rake drops into the gavel when it passes beyond the forward end of the camway from the force of gravity alone, and as near to the cutters as desired. The rear end of the arch D is connected to the main frame by the braces O and P.

The main driving and bearing wheel is connected to the main frame by the sector-plate Q, the forward end of which is hung upon the main pinion-shaft R, upon which it moves as upon a pivot, and is secured at its rear end to the main frame by the hook-headed clamping-bolt S. At a point near the rear end and upper edge of the sector-plate Q is secured the hollow axle T, upon which the main wheel B revolves. When the wheel B is in place upon the tubular axle T it is retained there by the sunken nut U. The rake's crank-shaft V passes through the tubular axle T, having its bearing therein, and has rigidly secured to its outer end a disk or plate, W, which is provided with a series of holes, X X, Fig. 2, into one of which the clutch-pin Y, projecting from the end of the hub of the wheel B, is sure to catch. On the inner side of the plate Q is the U-shaped spring Z and the clutch-lever $a$. One end of the spring Z rests in a channel cut in the crank-shaft V, so that the tension of the said spring tends constantly to move the crank-shaft V endwise toward the inner side of the machine, and therefore always tending to bring the plate W against the outer face of the hub of the wheel B, and the pin Y' in one of the holes X. When in this position the crank-shaft V will be in gear with the wheel B and revolve with it, for they move upon a common axis, and the rake will make one stroke and return for each revolution of the master-wheel; but when the clutch-lever $a$ is drawn back toward the sector-plate Q the crank-shaft V is caused to slide endwise toward the outer side of the machine, the plate W is pushed away from the end of the hub and the pin Y, so that there is no longer any connection with the master-wheel, and the rake ceases to move. The stop $b$ is provided for the retention of the clutch-lever in this position, when it is desired to hold the rake out of gear, as in going to and from the field.

Fig. 5 illustrates my improvement in hanging the reel. The sleeve $c$ is fitted to the reel-post $d$, so that it may slide up and down thereon, and be held at any point by a set-screw, $e$, or other equivalent means. Upon one side of the sleeve $c$ is the spindle $f$, with a screw-nut at its outer end. Upon this spindle is placed the pulley $g$, which has projected from one side two or more arms, $h$, diverging, to which the staves of the reel-wings are secured. The reel is driven by a belt to the main pinion-shaft.

Among the advantages to be derived from my arrangements may be mentioned the following:

By hanging the rake to a vibrating frame, as shown, its movements back and forth are accomplished with greater regularity, because the labor of the pitman is more regular, and there is therefore less liability to derangement.

By my peculiar mode of hanging the rake I am enabled to secure the advantages of the elbow movement, and at the same time I secure the advantages of the shortest possible platform, because by having the center around which the rake moves in its reciprocations as far forward as the line of the cutting apparatus, the rake commences to move sidewise as soon as it commences to move backward, and by moving the rake vertically upon an axis in rear of the line of the cutting apparatus I am enabled to give the rake the necessary rise from the platform and cause it to rise higher at the outer end than the inner end, as it should do to operate in the best manner upon the thicker grain falling at the outer end of the cutting apparatus.

By running the rake's crank-shaft through the tubular axle of the master-wheel I give said shaft a long bearing within said axle and dispense with all outside bearings, thus using the shortest possible shaft; and by using the plate W and pin Y, I can disconnect and stop the rake at any moment; and by the series of holes in the plate W, I am enabled to start it again at almost any moment, for one of the series of holes through the plate will be sure to catch the pin as soon as the spring is allowed to act.

By my method of hanging the reel I secure strength and cheapness of construction, for a comparatively light shaft may be made rigid by the sleeve, and, being simply inserted through the head and secured by a nut and washer, effectiveness is secured at the least possible cost.

Having described my invention, what I claim as new, and desire to secure by Letters Patent, is—

1. In combination with the quadrant J and rake N, arranged and operating substantially as set forth, the guides E and F and arm M, substantially as and for the purpose described.

2. The stationary hollow spindle T, its outside surface forming the bearing for the master-wheel, and its inside surface forming the bearing for the rake crank-shaft, substantially as shown.

3. Supporting the master-wheel upon a stationary hollow spindle secured at one end only, in combination with the rake crank-shaft running within the spindle.

4. Driving an automatic rake through the center of the driving-wheel and from the outer side thereof, substantially as and for the purpose described.

5. Communicating motion to the rake-shaft from the outer side by means of the plate W, or its equivalent, and the clutch-pin Y.

6. The combination of the sector-plate Q, hollow spindle T, and rake-shaft V, substantially as shown and described.

7. The combination or arrangement of the sleeve $c$, stationary spindle $f$, projecting from one side of said sleeve, and reel-pulley $g$, substantially as and for the purpose set forth.

WM. N. WHITELEY, JR.

Witnesses:
REUBEN MILLER,
GEO. W. BENNS.